(12) United States Patent
Kranich et al.

(10) Patent No.: US 12,510,311 B2
(45) Date of Patent: Dec. 30, 2025

(54) METHOD FOR THE PRODUCTION OF COMPONENT FOR FLUID FLOW THROUGH A HEAT EXCHANGER

(71) Applicant: MAHLE INTERNATIONAL GMBH, Stuttgart (DE)

(72) Inventors: Michael Kranich, Gemmrigheim (DE); Thomas Schiehlen, Eislingen (DE); Robin Wigena, Magstadt (DE); Andreas König, Mühlacker (DE); Jakob Praus, Stuttgart (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 107 days.

(21) Appl. No.: 18/624,393

(22) Filed: Apr. 2, 2024

(65) Prior Publication Data
US 2024/0337452 A1    Oct. 10, 2024

(30) Foreign Application Priority Data

Apr. 4, 2023 (DE) .......................... 102023203120.5

(51) Int. Cl.
*F28F 3/12* (2006.01)
*B21D 43/12* (2006.01)
(Continued)

(52) U.S. Cl.
CPC ............... *F28F 3/12* (2013.01); *B21D 43/12* (2013.01); *B21D 53/02* (2013.01); *F16B 11/006* (2013.01);
(Continued)

(58) Field of Classification Search
CPC ...... F28F 3/12; F28F 2245/00; F28F 2255/08; F28F 2275/025; B12D 43/12; B12D 53/02; F16B 11/006
(Continued)

(56) References Cited

U.S. PATENT DOCUMENTS 5,249,735 A * 10/1993 Sander ................... B01D 61/50
                                                          228/183
5,743,983 A    4/1998 Ogata et al.
(Continued)

FOREIGN PATENT DOCUMENTS

CN      201613576 U      10/2010
CN      108064323 A *    5/2018  ............... B32B 7/06
(Continued)

OTHER PUBLICATIONS

English Machine Translation of Search Report issued in DE102023203119.1 (Apr. 4, 2023).
(Continued)

*Primary Examiner* — Jon T. Schermerhorn, Jr.
(74) *Attorney, Agent, or Firm* — Barnes & Thornburg LLP

(57) ABSTRACT

A method for producing a component for a heat exchanger through which fluid flows is provided. A base plate is provided on which there is an adhesive layer formed by glue. A channel plate is placed on the surface of the base plate such that the channel plate is spaced apart from the base plate in at least one channel region to delimit at least one fluid channel, and is bears on the adhesive layer in at least one bonding region to obtain a material bond with the base plate. The channel plate and base plate are clamped together in and by a hot press, such that a material bond is formed between the base plate and the channel plate in the bonding region when the adhesive layer is heated. The base plate and channel plate are placed in a cold press such that the adhesive layer that was heated in the hot press is cooled while the base plate is clamped against the channel plate.

15 Claims, 2 Drawing Sheets

(51) Int. Cl.
*B21D 53/02* (2006.01)
*F16B 11/00* (2006.01)

(52) U.S. Cl.
CPC ....... *F28F 2245/00* (2013.01); *F28F 2255/08* (2013.01)

(58) Field of Classification Search
USPC ........................................................ 165/168
See application file for complete search history.

(56) References Cited

U.S. PATENT DOCUMENTS

| | | | |
|---|---|---|---|
| 10,695,940 B2 | 6/2020 | Imai | |
| 2015/0292808 A1* | 10/2015 | Cheng | B23P 15/26 29/890.032 |
| 2018/0250779 A1* | 9/2018 | Sailer | B23P 15/26 |

FOREIGN PATENT DOCUMENTS

| | | | | |
|---|---|---|---|---|
| CN | 212242393 U | 12/2020 | | |
| CN | 113334923 | 9/2021 | | |
| CN | 114379209 | 4/2022 | | |
| CN | 115008669 | 9/2022 | | |
| CN | 118775384 A | * 10/2024 | ............ | F16B 11/006 |
| CN | 118775385 A | * 10/2024 | ............ | B30B 15/064 |
| DE | 102013204744 | 9/2014 | | |
| DE | 102014217075 | 3/2016 | | |
| DE | 102016201405 | 8/2017 | | |
| DE | 102023203119 A1 | * 10/2024 | ............ | B30B 15/064 |
| DE | 102023203120 A1 | * 10/2024 | ............ | F16B 11/006 |
| WO | 2017/150498 | 9/2017 | | |

OTHER PUBLICATIONS

English Machine Translation of Search Report issued in DE102023203120.5 (Apr. 4, 2023).

* cited by examiner

METHOD FOR THE PRODUCTION OF COMPONENT FOR FLUID FLOW THROUGH A HEAT EXCHANGER

CROSS-REFERENCE TO RELATED APPLICATIONS

This application claims priority from German Patent Application No. DE 102023203120.5, filed Apr. 4, 2023, the entirety of which is hereby incorporated by reference herein.

The invention relates to a method for the production of a component for a heat exchanger through which fluid flows, and a component produced with this method. The invention also relates to an assembly for producing such a component.

Heat exchangers normally contain metal components bordering fluid channels. These components are frequently made of individual single pieces—in a relatively complicated process—that are joined together—e.g. by soldering—in the course of the production.

This is the basis for the invention, the object of which is to find a new way to develop components for heat exchangers. In particular, the object of the invention is to obtain a simplified and particularly inexpensive method for producing a component for a heat exchanger through which fluid can flow.

This problem is solved by the subject matter of the independent claims. Preferred embodiments are the subject matter of the dependent claims.

The fundamental concept of the invention is therefore to glue a metal base plate to metal channel plate with an adhesive in order to obtain the above component, by clamping the base plate to the channel plate under heat, and then cooling the component. The pressure in combination with heating the base plate and channel plate melts the adhesive layer formed by the glue. By pressing the components together, a strong adhesion can be obtained with the glue, resulting in a durable material bond between the base plate and the channel plate.

The joining process is facilitated by heating the adhesive layer when the base plate and channel plate are heated, because this distributes the adhesive layer evenly between the two components. This substantially improves the durability of the material bond between the components. The glue is then cured when the components are cooled. This also increases the durability of the material bond between the components. The combination of clamping and heating, and then cooling the base plate and channel plate, which is an essential aspect of the invention, is carried out with a hot press and a cold press, in which the components are both clamped and heated in the hot press and clamped and cooled in the cold press.

The method according to the invention contains a total of four steps, a) to d). The first step a) involves providing a base plate and channel plate to which an adhesive layer is applied, at least on sections of the surfaces of the base plate and/or channel plate (3). The thickness of the adhesive is preferably between 80 and 120 micrometers, ideally approx. 100 micrometers. In the second step b), the channel plate is placed on the base plate such that the channel plate is spaced apart from the base plate in order to delimit at least one fluid channel in at least one channel region, and bears on the base plate in at least one bonding region, where the adhesive has been applied to the base plate and/or the channel plate. The third step c) involves clamping the channel plate and base plate together with a hot press, which can preferably be heated, such that the adhesive is heated in the at least one bonding region between the base plate and the channel plate to obtain a material bond. This results in an optimal pressing of the channel plate to the base plate in order to obtain a material bond between these two components. This pressure is preferably only applied by the hot press to the bonding regions. In the fourth step d), the base plate and channel plate are placed in a cold press in order to cool the adhesive layer that was heated in the hot press. The cold press can be connected to a coolant reservoir for this.

In a preferred embodiment of the method according to the invention, a channel plate is provided in step a), with which at least two, preferably more, bonding regions are formed, and at least two, preferably more, channel regions are formed in step b). Fundamentally, there can be numerous bonds and numerous channel regions that alternate over the channel plate and base plate. An individual fluid channel can be obtained with the base plate and a respective channel region in this manner, that is sealed off from the exterior. Moreover, adjacent fluid channels are separated from one another by respective bonds.

Another advantageous development of the method according to the invention comprises a step a0) prior to step a). In step a0), the adhesive layer is formed by either coating the entire surface of the base plate or channel plate with the glue, or by only coating parts of the surfaces of the base plate or channel plate where the bonds will be formed. In the first version, it is ensured that there will always be glue, regardless of where the components come in contact with one another, with which the adhesion forming the material bond between the base plate and channel plate is obtained. In the second version, no adhesive layer is applied in the channel regions on the channel plate, since no glue is needed there.

In another preferred embodiment, the glue forming the adhesive layer is applied to the base plate or channel plate in a lamination process, with a roller, a dispenser, or by spreading or pressing it thereon. The person skilled in the art can thus select the appropriate method from these options for the specific application.

The base plate and channel plate are particularly preferably heated to at least 100° C. in the hot press, preferably 120° C. to 250° C., more preferably to a temperature between 150° C. and 220° C. This ensures that the glue will be liquified sufficiently, such that it can spread out over the entire bonding region between the channel plate and base plate. In this variation, the channel plate and base plate are also cooled to a maximum temperature of 70° C., preferably between 10° C. and 50° C. This ensures that the adhesive layer can cure sufficiently.

A particularly effective adhesion of the channel plate to the base plate at the at least one bond on the channel plate can be obtained with another preferred embodiment, according to which the base plate and channel plate are pressed together by the hot press and/or cold press with a pressure of 0.05 $N/mm^2$ to 1 $N/mm^2$, preferably 0.1 $N/mm^2$ to 1 $N/mm^2$.

An optimal liquification of the glue to create the material bond between the base plate and the channel plate can be obtained when the base plate is placed with the channel plate in the hot press for a (first) time period of 10 seconds to 30 minutes, preferably 10 second to 10 minutes, particularly preferably 30 seconds to 7 minutes.

An optimal curing of the glue to create the material bond between the base plate and the channel plate can be obtained when the base plate is placed with the channel plate in the cold press for a (second) time period of 10 seconds to 30 minutes, preferably 10 seconds to 10 minutes, particularly preferably 30 seconds to 7 minutes.

The invention also relates to a component for a heat exchanger that is produced with the method according to the invention presented above, such that the above advantages of the method also apply to the component according to the invention.

In a preferred embodiment of the component according to the invention, it extends along a direction of extension. The base plate is substantially flat, while the channel plate is curved, at least in sections. Furthermore, the base plate and channel plate can be joined in at least two regions that are spaced apart in this embodiment by the glue or adhesive layer, which is placed between the base plate and channel plate, at least in the bonding regions, with which the material bond is obtained, such that there is at least one channel region formed where the channel plate is spaced apart from the base plate, resulting in a fluid channel between the channel boundary region and the base plate.

The invention also relates to an assembly for producing a component for a heat exchanger through which fluid can flow by executing the method according to the invention presented above. The advantages explained above for the method according to the invention therefore also apply to the assembly according to the invention. This comprises a hot press for clamping a base plate for the component to a channel plate while heating an adhesive layer composed of a glue on the base plate and/or channel plate (3) to a temperature of at least 100° C., preferably 120° C. to 250° C., particularly preferably 150° C. to 110° C., to obtain a material bond between the base plate and the channel plate with the adhesive layer. The hot press can have a receiver for the base plate and the channel plate, and a moving stamp spaced apart from the receiver. The hot press, in particular the stamp and/or receiver, can be heated with electricity. The assembly also comprises a cold press for clamping the base plate to the channel plate, such that the adhesive layer is cooled to a maximum temperature of 70° C., preferably between 10° C. and 50° C. The cold press can also have a receiver for the base plate and the channel plate, and a moving stamp spaced apart from the receiver. The cold press, in particular its stamp and/or receiver, can be connected to a coolant reservoir.

In a preferred embodiment, the assembly comprises a conveyor for conveying the base plate and channel plate to the hot press and the cold press. This design is used for a partially or fully automated execution of the method according to the invention.

According to one advantageous embodiment, the conveyor has a conveyor belt on which the base plate and channel plate are placed and transported to the hot press and then to the cold press. The hot press and cold press are placed along the conveyor for this. This conveyor belt is available commercially, and is used for mass production of components.

Further important features and advantages of the invention can be derived from the dependent claims, the drawings, and the descriptions of the drawings.

It is understood that the features specified above and described below can be used not only in the given combinations, but also in other combinations or in and of themselves, without abandoning the framework of the present invention.

Preferred exemplary embodiments of the invention are shown in the drawings, and shall be explained in greater detail below, in which identical reference symbols are given to the same, similar, or functionally identical components.

Therein, schematically:

Figure 3:
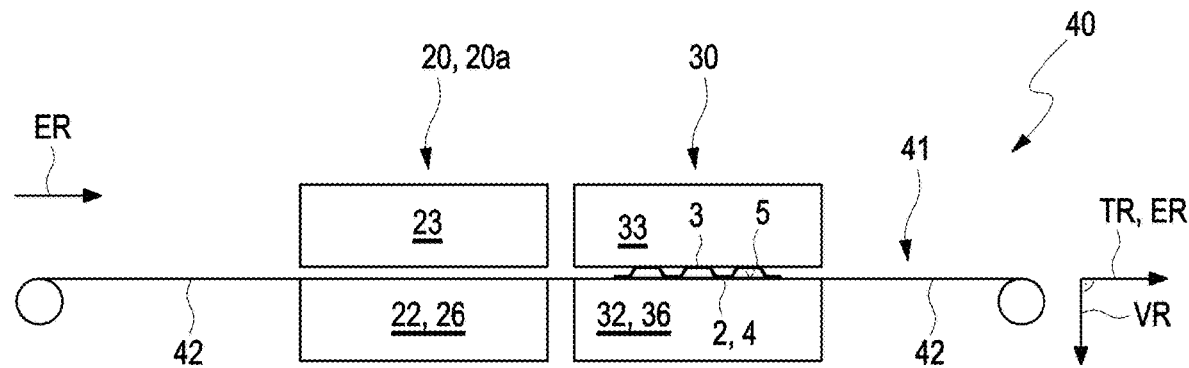
Figure 4:
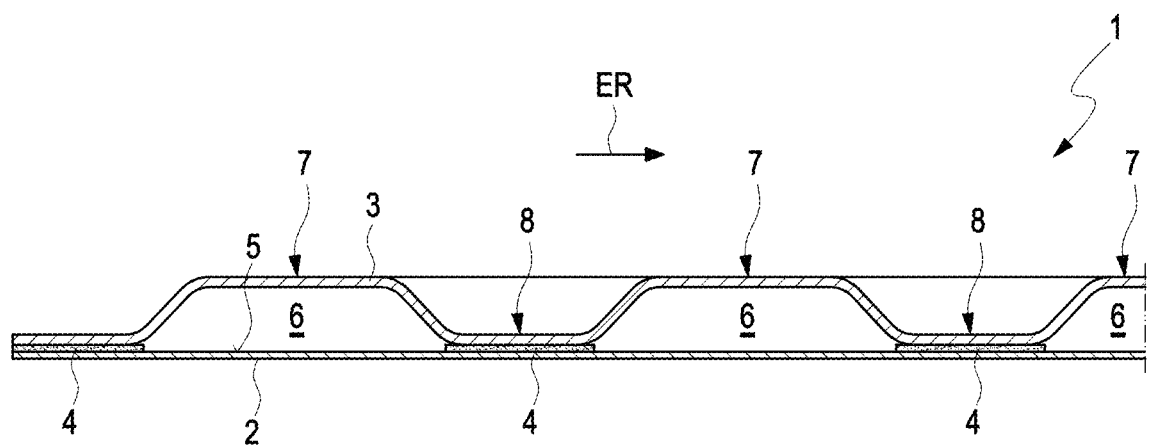
FIG. 4 shows an example of a component according to the invention.

The method according to the invention for producing a component 1 according to the invention, the longitudinal section of which is shown in FIG. 4 in a highly simplified illustration, shall be explained below in reference to FIGS. 1 to 3. The component 1 extends along a direction of extension ER in the longitudinal section shown in FIG. 4. The component 1 comprises a flat base plate 2 and a curved channel plate 3. The channel plate 3 can be corrugated in this direction.

The channel plate 3 is materially bonded to the base plate 2 at numerous separate bonding regions 8 by an adhesive layer 4 formed by a glue, and has numerous channel regions 7 spaced apart from the base plate 2, such that each channel region 7 forms a fluid channel 6 with the base plate 2. The channel boundary regions 7 and the bonding regions 8 alternate along the direction of extension ER.

Figure 1:
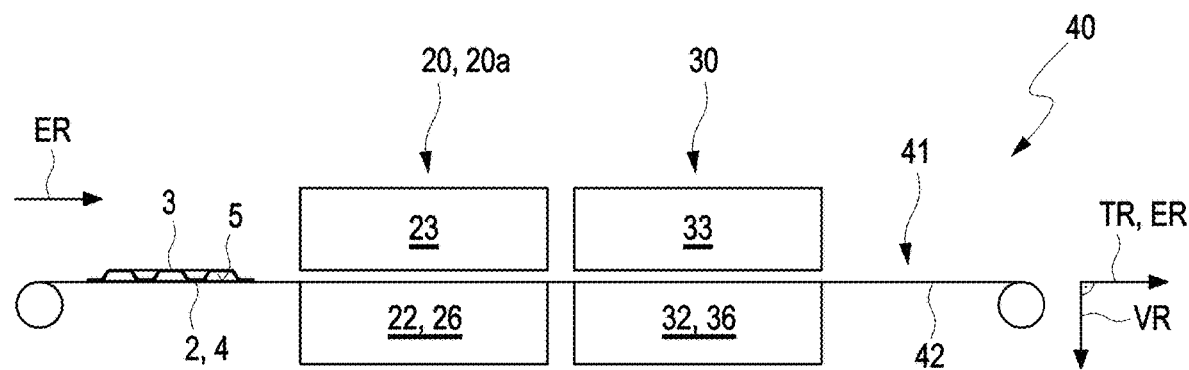
FIGS. 1 to 3 illustrate the method according to the invention.
Figure 2:
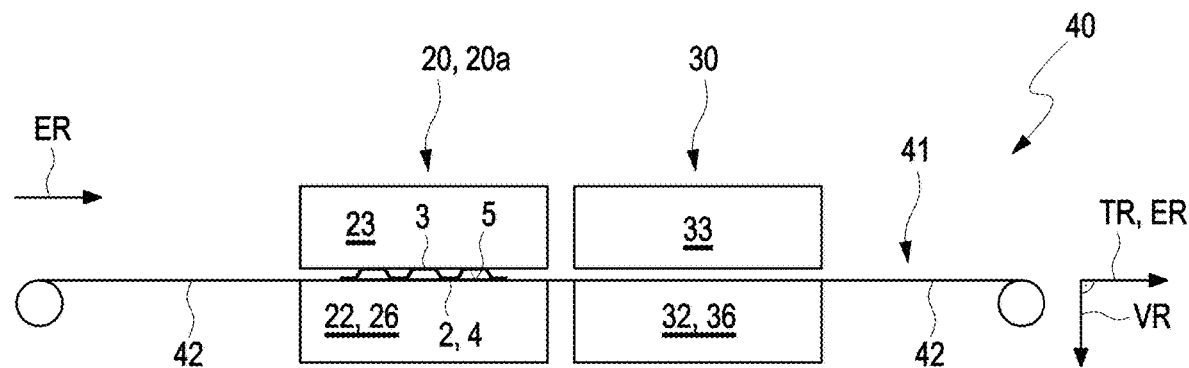

The component 1 according to the invention is produced with the assembly 40 according to the invention, roughly illustrated schematically in FIGS. 1 to 3.

The assembly 40 comprises a clamp 20a formed by a hot press 20 for clamping the base plate 2 to the channel plate 3 while heating the adhesive layer 4 on the base plate 2. The hot press 20 can be heated with electricity. The hot press 20 comprises a receiver 22 for the base plate 2 and the channel plate 3. The receiver 22 can be a plate 26 with a flat surface on which the flat base plate 2 can be placed. The hot press 30 can also have a moving stamp 23 at a spacing to the receiver 22.

The assembly 40 also comprises a separate cold press 30 for clamping the base plate 2 to the channel plate 3, and cooling the adhesive layer 4. The cold press 30 also comprises a receiver 32 for the base plate 2 and the channel plate 3. This receiver 32 can also be a plate 36 with a flat surface for the flat base plate 2. The cold press 30 can also have a moving stamp 33 at a spacing to the receiver 32. The cold press can be connected to a coolant reservoir (not shown):

As can be seen in FIG. 1, the assembly 40 can contain a conveyor 41 for conveying the base plate 2 and channel plate 3 to the hot press 20 and then to the cold press 30. The conveyor 41 comprises a conveyor belt 42, on which the base plate 2 and channel plate 3 are placed and can be conveyed in the direction of transport TR to the hot press 20 and then to the cold press 30. The hot press 20 and cold press 30 are next to one another along the direction of transport TR. In this example, the direction of extension ER for the base plate 2 and channel plate 3 is identical to the direction of transport TR. The two stamps 23 and 33 can be moved in a direction VR, which is perpendicular to the direction of transport TR.

The method according to the invention described below comprises four steps a) to d).

In a first step a), a base plate 2 is provided, as shown in FIG. 1, and placed on the conveyor belt 42 in the conveyor 41. An adhesive layer 4 is placed on the surface 5 of the base plate 2 in the bonding regions 8.

In a second step b), the channel plate 3 is placed on the surface 5 of the base plate 2 such that the channel plate 3 is spaced apart from the base plate in numerous channel regions 7 to obtain the fluid channels 6 (see FIG. 4), and bears on the base plate 2 in the bonding regions 8 to materially bond with the adhesive layer 4. The base plate 2 and channel plate 3 can be conveyed to the receiver 22 in the hot press by the conveyor belt 42 in the conveyor 41. This is shown in FIG. 2.

In a third step c), the channel plate 3 and base plate 2 are pressed together by a clamp 20a formed by the hot press 20, such that the adhesive layer 4 is heated in the bonding regions 8 (not visible in FIGS. 1 to 3, see FIG. 4) between the base plate 2 and the channel plate 3, to obtain a material bond.

By moving the stamp 23 toward the receiver 22, the channel plate 3 is pressed against the base plate 2. A predefined pressure is exerted by the stamp 23 on the channel plate 3 in the known manner. Because both the stamp 23 and the receiver 22, or receiver plate 26 can be heated, the stamp 23 is not only in mechanical contact, but also thermal contact with the channel plate 3, and the receiver is also in both mechanical and thermal contact with the base plate 2. This heats the adhesive layer 4 on the base plate while the channel plate 3 is pressed against the base plate 2. To obtain the material bond between the base plate 2 and the channel plate 3, the adhesive layer 4 is heated to a temperature of at least 100° C., preferably between 120° C. and 250° C., particularly preferably 150° C. to 220° C. The base plate 2 and the channel plate 3 can be pressed together in the hot press 20 with a pressure generated by the stamp 23 that is between 0.05 N/mm$^2$ and 1 N/mm$^2$, preferably between 0.1 N/mm$^2$ and 1 N/mm$^2$.

In this example, the base plate 2 and the channel plate 3 are placed in the hot press 20 for a first time period T1 of 10 seconds to 30 minutes, preferably 10 seconds to 10 minutes, particularly preferably 30 second to 7 minutes.

After clamping and heating in the hot press 20, the base plate 2 is conveyed with the channel plate 3 by the conveyor belt 42 in the conveyor 41 from the hot press 20 to the receiver 32 in the cold press 30. This is shown in FIG. 3.

In a fourth step d), the base plate 2 and channel plate 3 are cooled in the cold press 30 while the base plate 2 is pressed against the channel plate 3. The cold press 30 is connected to a coolant reservoir (not shown) for this.

By moving the stamp 33 in the cold press 30 toward the receiver, the channel plate 3 can be pressed against the base plate 2 in the receiver 32. Because the stamp 33 and the receiver 32 in the cold press 30 are both connected to a coolant reservoir (not shown), the base plate 2, channel plate 3, and adhesive layer 4 are cooled through the mechanical and thermal contact to the cold press 30, its stamp 33, and its receiver 32.

The channel plate 3 and base plate 2 are cooled by this means in the cold press 30 to a maximum temperature of 70° C., preferably between 10° C. and 50° C. The base plate 2 and channel plate 3 can be clamped in the cold press 30 at a pressure generated by the stamp in the cold press 30 of 0.05 N/mm$^2$ to 1 N/mm$^2$, preferably 0.1 N/mm$^2$ to 1 N/mm$^2$.

In this example, the base plate 2 is placed in the cold press 30 for a second time period T2 of 10 seconds to 30 minutes, preferably 10 seconds to 10 minutes, particularly preferably 30 seconds to 7 minutes.

The component 1 according to the invention is finished after it has cooled off, and can be removed from the cold press 30 by the conveyor belt 42 in the conveyor 41.

The method according to the invention can contain a step a0) prior to the step a) (not shown in the drawings). In this step a0), the adhesive layer 4 is formed by either completely coating the surface 5 of the base plate 2 with the glue, or by coating the bonding regions 8 on the surface 5 of the base plate 2.

In the above example, only the base plate 2 is coated with the glue forming the adhesive layer 4. It is also possible to coat the channel plate 3 with an adhesive layer 4 formed by glue.

The specification is readily understood with reference to the following Numbered Paragraphs:

Numbered Paragraph 1. A method for producing a component (1) for a heat exchanger through which fluid can flow, comprising the following steps:
 a) providing a base plate (2) and a channel plate (3), wherein an adhesive layer (4) formed by glue is placed on the surface (5) of the base plate (2) and/or the channel plate (3), at least in specific areas,
 b) placing the channel plate (3) on the surface (5) of the base plate (2) such that the channel plate (3) is spaced apart from the base plate (2) to delimit at least one fluid channel (6) in at least one channel region (7), and bears on the adhesive layer (4) on the base plate (2) and/or the channel plate (3) to obtain a material bond in at least one bonding region (8),
 c) clamping the channel plate (2) to the base plate (6) in, or with, a hot press (20), such that a material bond is obtained in the at least one bonding region (8) between the base plate (2) and the channel plate (3) when the adhesive layer (4) is heated,
 d) cooling the base plate (2) and the channel plate (3) in, or with, a cold press (30), such that the adhesive layer (4) heated in the hot press (20) is cooled.

Numbered Paragraph 2. The method according to Numbered Paragraph 1, characterized in that a channel plate (2) is provided in step a), with which at least two, preferably more, bonding regions (8) and at least two, preferably more, channel regions (7) are formed in step b).

Numbered Paragraph 3. The method according to Numbered Paragraph 1 or 2, comprising step a0) prior to step a), in which
 the adhesive layer (4) is formed by completely coating the surface (5) of the base plate (2) or the channel plate (3) with the glue, or
 the adhesive layer (4) is formed by coating parts of the surface (5) of the base plate (2) or channel plate (3) where the at least one bonding region (8) is to be formed.

Numbered Paragraph 4. The method according to any of the Numbered Paragraphs 1 to 3, characterized in that the glue is applied to the base plate (2) and/or the channel plate (3) in a lamination process, with a roller, a dispenser, or by spreading or pressing it thereon.

Numbered Paragraph 5. The method according to any of the preceding Numbered Paragraphs, characterized in that
 the channel plate (3) and base plate (2) are heated to a temperature of at least 100° C., preferably between 120° C. and 250° C., particularly preferably between 150° C. and 220° C. in the hot press (20),
 the channel plate (3) and base plate (2) are cooled to a maximum temperature of 70° C., preferably between 10° C. and 50° C.

Numbered Paragraph 6. The method according to any of the preceding Numbered Paragraphs, characterized in that the base plate (2) and the channel plate (3) are clamped in the hot press (20) and/or cold press (30) at a pressure generated therewith of 0.05 N/mm$^2$ to 1 N/mm$^2$, preferably 0.1 N/mm$^2$ to 1 N/mm$^2$.

Numbered Paragraph 7. The method according to any of the preceding Numbered Paragraphs, characterized in that the base plate (2) is placed with the channel plate (3) in the hot press (20) for a (first) time period (T1) of 10 seconds to 30 minutes, preferably 10 seconds to 10 minutes, particularly preferably 30 seconds to 7 minutes, and/or the base plate is placed with the channel plate (3) in the cold press for a (second) time period (T2) of 10 seconds to 30 minutes, preferably 10 seconds to 10 minutes, particularly preferably 30 seconds to 7 minutes.

Numbered Paragraph 8. A component (1) for a heat exchanger, produced with the method according to any of the preceding Numbered Paragraphs.

Numbered Paragraph 9. The component according to Numbered Paragraph 8, characterized in that the component (1) extends along the direction of extension (ER), in a longitudinal section along the direction of extension (ER), the base plate (2) is substantially flat, the channel plate (3) is curved, at least in sections, the base plate (2) and channel plate (3) are materially bonded by the glue in at least two bonding regions (8) that are spaced apart from one another, and the channel plate is spaced apart from the base plate (2) in at least one channel region (7), such that the at least one channel region (7) forms a fluid channel (6) with the base plate (2).

Numbered Paragraph 10. An assembly (40) for producing a component (1) through which a fluid can flow, in particular according to Numbered Paragraph 8 or 9, when the method according to any of the Numbered Paragraphs 1 to 7 is executed therewith, containing a hot press (20) with which the a base plate (2) is clamped to a channel plate (3) while heating an adhesive layer (4) on the base plate (2) and/or the channel plate (3) to a temperature of at least 100° C., preferably between 120° C. and 250° C., particularly preferably 150° C. to 220° C., to obtain a material bond between the base plate (2) and the channel plate (3), a cold press (30) for clamping the base plate (2) to the channel plate (3) such that the adhesive layer (4) is cooled to a maximum temperature of 70° C., preferably between 10° C. and 50° C.

Numbered Paragraph 11. The assembly according to Numbered Paragraph 10, characterized in that the assembly (40) contains a conveyor (41) with which the base plate (2) and channel plate (3) are conveyed to the hot press (20), and then from the hot press (20) to the cold press (30).

Numbered Paragraph 12. The assembly according to Numbered Paragraph 11, characterized in that the conveyor (41) comprises a conveyor belt (42) on which the base plate (2) is placed with the channel plate (3), and can be conveyed in the direction of transport (TR) to the hot press (20) and from the hot press (20) to the cold press (30), wherein the hot press (20) and cold press (30) are placed along the direction of transport (TR).

The invention claimed is:

1. A method for producing a component for a heat exchanger through which fluid can flow, comprising the following steps:

a) providing a base plate and a channel plate, wherein an adhesive layer formed by glue is placed on the surface of the base plate and/or the channel plate, at least in specific areas, b) placing the channel plate on the surface of the base plate such that the channel plate is spaced apart from the base plate to delimit at least one fluid channel in at least one channel region, and bears on the adhesive layer on the base plate and/or the channel plate to obtain a material bond in at least one bonding region, c) clamping the channel plate to the base plate in, or with, a hot press, such that a material bond is obtained in the at least one bonding region between the base plate and the channel plate when the adhesive layer is heated, d) cooling the base plate and the channel plate in, or with, a cold press, such that the adhesive layer heated in the hot press is cooled.

2. The method according to claim 1, wherein a channel plate is provided in step a), with which at least two bonding regions and at least two channel regions are formed in step b).

3. The method according to claim 1, comprising step a0 prior to step a), in which the adhesive layer is formed by completely coating the surface of the base plate or the channel plate with the glue, or the adhesive layer is formed by coating parts of the surface of the base plate or channel plate where the at least one bonding region is to be formed.

4. The method according to claim 1, wherein the glue is applied to the base plate and/or the channel plate in a lamination process, with a roller, a dispenser, or by spreading or pressing it thereon.

5. The method according to claim 1, wherein the channel plate and base plate are heated to a temperature of at least 100° C., in the hot press, the channel plate and base plate are cooled to a maximum temperature of 70° C.

6. The method according to claim 1, wherein the base plate and the channel plate are clamped in the hot press and/or cold press at a pressure generated therewith of 0.05 N/mm² to 1 N/mm², preferably 0.1 N/mm² to 1 N/mm².

7. The method according to claim 1, wherein the base plate is placed with the channel plate in the hot press for a first time period (T1) of 10 seconds to 30 minutes and/or the base plate is placed with the channel plate in the cold press for a second time period (T2) of 10 seconds to 30 minutes.

8. A component for a heat exchanger, produced with the method according to claim 1.

9. The component according to claim 8, wherein the component extends along the direction of extension (ER), in a longitudinal section along the direction of extension (ER), the base plate is substantially flat, the channel plate is curved, at least in sections, the base plate and channel plate are materially bonded by the glue in at least two bonding regions that are spaced apart from one another, and the channel plate is spaced apart from the base plate in at least one channel region, such that the at least one channel region forms a fluid channel with the base plate.

10. An assembly for producing a component through which a fluid can flow, according to claim 9, comprising a hot press with which the a base plate is clamped to a channel plate while heating an adhesive layer on the base plate and/or the channel plate to a temperature of at least 100° C. to obtain a material bond between the base plate and the channel plate, a cold press for clamping the base plate to the channel plate such that the adhesive layer is cooled to a maximum temperature of 70° C.

11. The assembly according to claim 10, wherein the assembly contains a conveyor with which the base plate and channel plate are conveyed to the hot press, and then from the hot press to the cold press.

12. The assembly according to claim 11, wherein the conveyor comprises a conveyor belt on which the base plate is placed with the channel plate, and can be conveyed in the direction of transport (TR) to the hot press and from the hot press to the cold press, wherein the hot press and cold press are placed along the direction of transport (TR).

13. The method according to claim 5, wherein the channel plate and the base plate are heated to a temperature of between 120° C. and 250° C., and the channel and base plate are cooled to a maximum temperature of between 10° C. and 50° C.

14. The method according to claim 5, wherein the channel plate and the base plate are heated to a temperature of between 150° C. and 220° C., and the channel and base plate are cooled to a maximum temperature of between 10° C. and 50° C.

15. The method of claim 6, wherein the base plate and the channel plate are clamped in the hot press and/or the cold pressure at a pressure generated therewithin of preferably $0.1 \text{ N/mm}^2$ to $1 \text{ N/mm}^2$.

* * * * *